United States Patent [19]
Rizvi et al.

[11] Patent Number: 5,417,992
[45] Date of Patent: May 23, 1995

[54] SUPERCRITICAL FLUID EXTRUSION PROCESS AND APPARATUS

[75] Inventors: Syed S. H. Rizvi; Steven Mulvaney, both of Ithaca, N.Y.

[73] Assignee: Cornell Research Foundation, Inc., Ithaca, N.Y.

[21] Appl. No.: 209,255

[22] Filed: Mar. 14, 1994

[51] Int. Cl.⁶ .................. A21D 8/00; A21C 1/00; A23P 1/00
[52] U.S. Cl. .................. 426/283; 99/450.6; 99/450.7; 366/85; 425/204; 426/446; 426/448; 426/504; 426/516; 426/519
[58] Field of Search ............... 426/281, 283, 446, 448, 426/449, 498, 504, 516, 519, 549; 99/450.6, 450.7; 366/85, 105; 425/204, 208

[56] References Cited

U.S. PATENT DOCUMENTS

| | | | |
|---|---|---|---|
| 1,725,171 | 4/1924 | Anderson | 426/446 |
| 3,041,176 | 7/1959 | Baker | 426/498 |
| 3,541,946 | 11/1970 | Johnston et al. | 425/133.1 |
| 3,615,675 | 10/1971 | Wisdom et al. | 426/283 |
| 3,986,890 | 10/1976 | Richter et al. | 426/578 |
| 4,054,271 | 10/1977 | Lanzillo | 99/450.7 |
| 4,218,480 | 8/1980 | Dyson et al. | 426/498 |
| 4,364,961 | 12/1982 | Darley et al. | 426/498 |
| 4,418,088 | 11/1983 | Cantenot | 426/448 |
| 4,423,078 | 12/1983 | Darley et al. | 426/516 |
| 4,438,146 | 3/1984 | Colby et al. | 426/448 |
| 4,465,702 | 8/1984 | Eastman et al. | 426/578 |
| 4,568,550 | 2/1986 | Fulger et al. | 426/498 |
| 4,594,322 | 6/1986 | Thompson et al. | 435/95 |
| 4,609,558 | 9/1986 | Giacone et al. | 426/549 |
| 4,675,198 | 6/1987 | Sevenants | 426/486 |
| 4,762,723 | 8/1988 | Strong | 426/516 |
| 4,786,514 | 11/1988 | Wiedmann | 426/448 |
| 4,846,054 | 7/1989 | Mange et al. | 99/495 |
| 4,880,653 | 11/1989 | Keller et al. | 426/549 |
| 4,888,192 | 12/1989 | Ramnarine | 426/448 |
| 4,946,697 | 8/1990 | Payne | 426/445 |
| 4,979,434 | 12/1990 | van Lengerich | 366/85 |
| 5,011,696 | 4/1991 | Haas et al. | 426/28 |
| 5,079,012 | 1/1992 | Lengerich et al. | 426/549 |
| 5,089,283 | 2/1992 | Wilson | 426/498 |
| 5,120,559 | 6/1992 | Rizvi et al. | 426/448 |
| 5,124,161 | 6/1992 | van Lengerich et al. | 426/283 |

Primary Examiner—George Yeung
Attorney, Agent, or Firm—Jones, Tullar & Cooper

[57] ABSTRACT

A continuous process and apparatus for making bread and bread-like products using supercritical fluid extrusion are disclosed. The process is carried out in a dough mixer and extruder into which supercritical $CO_2$ is injected to provide proofing of the product. Rising of the dough is produced by a combination of hydrodynamic expansion of air bubbles and diffusion of $CO_2$ into said bubbles as the dough is extruded through an exit die, without the need for yeast. A filler material may be introduced into the core of the extruded product by a coextruder located within the extruder, to provide a continuous process for producing a coextruded filled product consisting of a fully cooked cereal-based outer core filled with a pumpable filling injected into the hollow center of the product. Also, controlled acid hydrolysis of the starches in the dough may be used to produce reducing sugars that add desirable flavor to the final product.

10 Claims, 4 Drawing Sheets

SUPERCRITICAL FLUID EXTRUSION PROCESS AND APPARATUS

BACKGROUND OF THE INVENTION

The present invention relates, in general to the continuous processing of food products such as bread by gas expansion and diffusion, and to a coextrusion process for producing a dual-textured, expanded and filled product.

The invention relates to, and is an improvement over, the apparatus and the process described and claimed in U.S. Pat. No. 5,120,559, of Syed S. H. Rizvi and Steven Mulvaney, the disclosure of which is hereby incorporated herein in its entirety.

Extrusion cooking of foods is a well known process which is practiced on large commercial scales in countries throughout the world. Extrusion cooking generally involves the mixing of food products in an extruder under conditions of high temperature, high pressure and high shear, with the cooked product being extruded through an exit die. Often, the extruded food product is expanded, or puffed, by the release of steam as the product exits the die. However, in such prior procedures the degree of puffing is dependent on a severe cooking process which increases the barrel wear in the extruder, drastically increases the starch solubility of the extrudate, and limits the use of heat sensitive or shear sensitive ingredients, such as flavors or proteins, so that such ingredients must be added to the food product after the extrusion and cooking process, as by spraying these ingredients onto the surface of the extrudate. Generally, in such prior processes, the extrudate must have an appreciable moisture content to enable the product to flow through the extruder. This means that a significant part of the throughput of the extruder is water, and even though much of the water will flash off so as to expand the product at the outlet of the die, nevertheless the high moisture content requires a drying step for the extruded product in many cases. Furthermore, since the moisture content affects both the expansion of the product and its cell structure and texture, it is difficult to specify both expansion and texture independently in such conventional processes.

In prior U.S. Pat. No. 5,120,559, an improved process for producing a food product is described. In this patent, a supercritical fluid (SCF) is introduced into a cooking extruder under conditions which are effective to produce a product having an improved texture, appearance, and flavor. In accordance with the invention, a conventional cooking extruder is modified to extend beyond the cooking and cooling sections to provide a section for injection, mixing and selective removal of a supercritical fluid. Such a fluid may be, for example, carbon dioxide ($CO_2$) at a pressure greater than about 72.9 atmospheres (1072 psi) and at a temperature greater than about 31° C. At this temperature and pressure, $CO_2$ is at its critical point, and has properties of both a liquid and a gas. If the pressure is further increased, the $CO_2$ density increases and has numerous desirable qualities which result in an improved extrusion process.

The first section of the extruder functions as a typical cooker, whereby a food product (e.g. cereal flour) is heated as by the injection of steam, and, if necessary, is gelatinized. If the product temperature is too high, a vent is provided on the extruder to release some steam to lower the temperature. Following the cooking section is a cooling section, which may include a cooling jacket to bring the temperature of the product down to a desired level. Thereafter, the supercritical fluid (SCF) is injected into the product stream at a selected location along the extruder. This fluid preferably is loaded with soluble materials such as flavoring, coloring, nutrients, etc. which are to be added to the product. The product may have a temperature in the range of 85° to 95° C., for example, in the region of injection of the supercritical fluid, and since this temperature is higher than that of the SCF, it causes a reduction in the fluid density, with the result that the solute material carried by the fluid is released into the product in the extruder. The product is then carried through a mixing section in the extruder which thoroughly incorporates the solute material into the product.

Although the supercritical fluid density is reduced upon injection into the product, the solubility of the fluid in the aqueous phase of the in-barrel product is still significant due to high pressure in the extruder, and accordingly, the supercritical fluid which remains in the product after mixing can be used to control the final product density by expansion, or puffing, of the product as it exits the extruder die. The extent of puffing and the addition of solutes are controlled by the amount and conditions of the SCF introduced into the extruder. The supercritical fluid can be partially or fully vented before the product exits the extruder so that the expansion of the product leaving the extrusion die is controlled, or if desired is not expanded at all. In addition, the temperature and pressure dependence on solubility of the SCF is utilized to obtain controlled hydrolysis of starches in the extrudate to obtain different characteristics in the end product.

The process of U.S. Pat. No. 5,120,559 has several advantages over the traditional extrusion cooking process. For example, the use of a supercritical fluid such as $CO_2$ permits simultaneous expansion, flavoring, and reduction of viscosity. Further, extruded foams with different textural and mechanical properties can be produced by independently varying the mechanical energy input to the food product and thus varying starch degradation and or protein denaturation in the cooking zone, by venting the extruder if necessary, and by controlling the density (or the degree of expansion) of the extruded product by varying the flow of supercritical fluids into the cooled extruder product. If the product in the extruder is less than about 100° C., then puffing due to the conversion of water to steam is prevented, and all expansion of the product upon extrusion will be due to the presence of the supercritical fluid.

The expansion, or puffing process, provided by supercritical fluids such as $CO_2$ is much less explosive than the puffing that results from the conversion of water into steam. Accordingly, the supercritical fluid expansion produces a product with a smooth outer surface and uniform, regularly-shaped, internal pores.

A further advantage to the method and apparatus of the patent is that flavoring, coloring, nutrients, and the like added by way of the supercritical fluids are dissolved directly into the dough within the extruder and thus are incorporated directly into the product before it reaches the extrusion die, so that post-extrusion flavoring operations and the like can be eliminated. The incorporation of heat sensitive and/or volatile flavoring materials just before the exit die by including them in the supercritical fluid minimizes the loss of such materials due to heat or steam stripping of volatiles, as happens in the water vapor puffed products. Also, a supercritical fluid such as CO$_2$, when used for product expansion, reduces the viscosity of the product in the extruder so that the pressure at the exit die is significantly reduced. As a result, throughput can be increased at a lower moisture content, without exceeding the motor torque or die pressure limitations of the extruder. The reduction in product viscosity can also lead to a lower energy requirement for operation of the extruder.

A supercritical fluid such as CO$_2$ can be used to adjust the pH of the product in the extruder, and therefore products with the characteristics of acid modified starches can be produced. This process also allows control of the color and the functional and rheological characteristics of the extrudate.

SUMMARY OF THE INVENTION

The present invention is directed to modifications of the above-described method and apparatus to provide a new and unique food product and to the products produced by the novel extrusion apparatus.

The invention, in one aspect, relates to the continuous production of bread and bread-like products utilizing the supercritical fluid extrusion (SCFX) process. The method includes kneading or mixing dough inside an extruder, injecting supercritical carbon dioxide gas into the dough to bring in flavor additives characteristic of a fermentation process or other flavors, and to proof the dough. Thereafter, a slit-die is used to make continuous slices or a bread box type of mold is used to form loaves, and the extruded and formed shape is baked to set the foam structure and further develop the texture and color of the bread. The supercritical carbon dioxide (SC—CO$_2$) is used instead of yeast to provide proofing so that the dough rises upon expansion of the gas as the dough passes through an extruder die. The process permits short-time continuous bread making, since no fermentation step is necessary, the supercritical carbon dioxide providing the necessary proofing and leavening. Flavor or color can be added at controlled rates by the SC—CO$_2$ process and the expansion volume is controlled by the conditions used in that process. Various shapes can be made simply by changing the extruder die.

Unlike prior art U.S. Pat. No. 5,120,559, the present invention involves injection of an amount of supercritical CO$_2$ just equal to that soluble under the conditions of temperature and pressure, and maintaining these conditions through the length of the extruder. Therefore cells present for growth in the dough consist only of air or other insoluble gases, just as is the case after mixing in conventional breadmaking. Upon exiting through the die, the air cells first expand due to the pressure drop experienced, but then undergo an additional cell growth phase due to diffusion of the dissolved CO$_2$ gas into the air cells. This combination of hydrodynamic expansion of air bubbles and diffusion of CO$_2$ exactly reproduces the sequence in conventional breadmaking and results in crumb structures very similar to that for the conventional breads. Without the diffusion controlled growth step, breads leavened by gas injection alone may contain a greater number of smaller and more uniform cells, not characteristic of conventionally baked breads, as pointed out in U.S. Pat. No. 3,041,176. Alternatively, the dissolved SC—CO$_2$ can also be made to nucleate. Unlike prior U.S. Pat. No. 5,120,559, the process of the present invention permits injection of SC—CO$_2$ alone or in combination with other gases such as air, oxygen, etc., which remain insoluble under the operating conditions. These additional insoluble gases may serve to provide gas cells into which the soluble SC—CO$_2$ may diffuse upon reduction of pressure.

Another aspect of the invention is the continuous production of a puffed or porous product with another material inserted in its center during extrusion. Such coextrusion cannot be accomplished using conventional cooking extrusion processes where the expansion of the product involves a phase change; for example, where water under pressure changes to steam at the die to produce puffed or porous products. In accordance with the invention, expansion or puffing of the product occurs by gas expansion and diffusion, the expansion occurring gradually from inside to outside, leaving a central core of empty space and a naturally formed expanded outer layer or skin. This permits coextrusion of a core or filler material centrally located within the puffed product.

Still another aspect of the invention involves the use of supercritical fluid extrusion for providing dextrinized starches, which are formed under conditions of acid, heat, and pressure to cause rupture of the $\alpha$ (1–4) C—O—C links in the native starch. It has been found that under certain operating condition the combination of temperature, pressure and acid conditions existing within the extruder of the present invention are the same as those described for other processes for dextrinization of starch, but the advantage of directly providing SC—CO$_2$ into a dough at a temperature around 100°–120° C. in an extruder is that the degree of acid hydrolysis can be controlled by continuously controlling the water level; i.e., the moisture content of the dough, and the amount of SC—CO$_2$ introduced. The solubilization of SC—CO$_2$ into the water phase results in the formation of carbonic acid and the development of an acid pH environment for starch hydrolysis. A major advantage of this process is that the acid environment only exists under the high pressure conditions within the extruder. Upon exiting the die into an atmospheric pressure environment, the product returns to a neutral pH without any residual acid. The extruder also provides for a continuous, very short time conversion process, and product characteristics can be continually changed by adjusting the SC—CO$_2$/water ratio within the extruder. Since CO$_2$ is also an accepted food ingredient, modified starches produced in this manner can be used not only as a food thickener, but in non-food industrial processes where dextrins are currently used for their thickening and adhesive properties, such as in the paint, paper, and pharmaceutical industries.

In a typical process, in accordance with the invention, the extruded dextrinized starch product is dried and milled into the desired particle size for use as a functional ingredient. Alternatively, a low degree of hydrolysis can be imparted to a puffed product, which is then dried and used directly as a baked-type product, ready to eat cereal, or snack food. The formation of reducing sugars in this manner imparts unique and pleasing flavors to the extruded products.

BRIEF DESCRIPTION OF THE DRAWINGS

The foregoing, and additional objects, features, and advantages of the present invention will be apparent to those of skill in the art from the following detailed description of preferred embodiments thereof, taken in conjunction with the accompanying drawings, in which.

DESCRIPTION OF PREFERRED EMBODIMENTS

Figure 1:
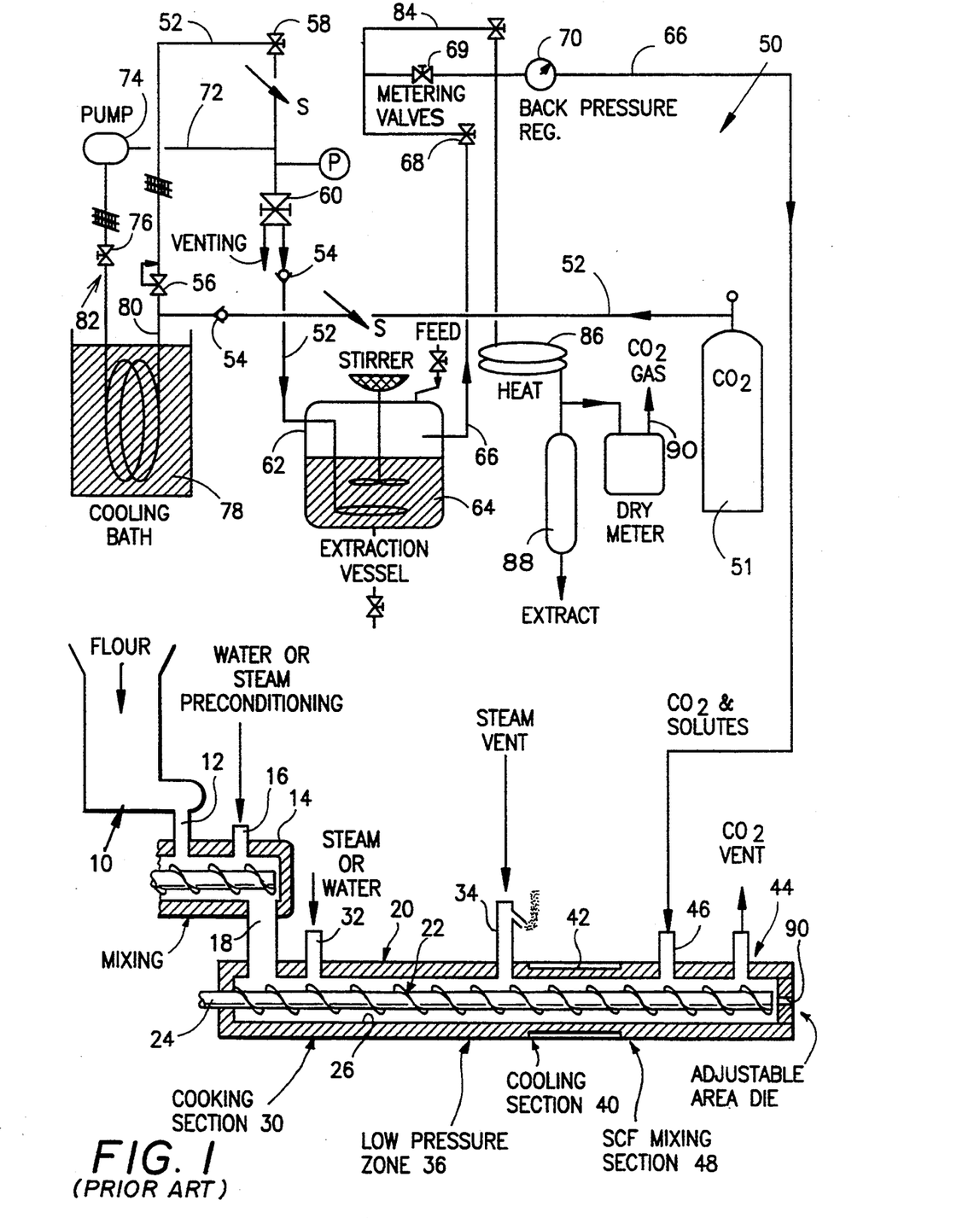
FIG. 1 is a diagrammatic illustration of apparatus for carrying out a supercritical fluid extrusion process.

FIG. 1 illustrates the extrusion apparatus of U.S. Pat. No. 5,120,559, which includes a hopper 10 which supplies ingredients, such as cornmeal, for a product to be processed through a suitable outlet 12 to a mixer 14, where the ingredients are preconditioned by steam or water by way of inlet 16 to form a dough. The dough is supplied through outlet 18 to an extruder 20 which includes a pair of conveying screws, such as screw 22 carried on shaft 24, extending longitudinally through the barrel 26 of the extruder. The extruder includes a cooking section 30 where additional steam or water may be injected through inlet 32. An optional steam vent 34 is provided after the cooking section 30 in a low pressure zone 36 where the dough temperature is lowered. A cooling section 40 follows the vent head 34, where a cooling chamber or other suitable cooling structure is provided.

At a location spaced upstream from the exit end 44 of the extruder, but downstream from the steam vent 34, is an inlet 46 through which a supercritical fluid can be injected into a mixing section 48 in the extruder. The supercritical fluid preferably is carbon dioxide at a temperature and pressure which causes it to be in a transition state between its liquid and gas phases. This supercritical fluid preferably also contains soluble additives such as flavoring, nutrients, color and the like which are to be injected into and mixed with the dough.

The supercritical fluid is supplied by an extraction unit 50 which supplies carbon dioxide from a gas cylinder 51 through a high pressure line 52 incorporating a pair of check valves 54 and flow control valves 56, 58, and 60. Line 52 leads to an extraction vessel 62, where selected additives are provided. The additives may be in the form of a liquid 64 through which the $CO_2$ is bubbled, with the $CO_2$ and the additives then being supplied by way of high pressure output line 66, which includes metering valves 68 and 69 and a back pressure regulator 70, to the extruder.

In one form of the device illustrated in U.S. Pat. No. 5,120,559, the supercritical fluid supply line 52 is connected by way of a bypass line 72, through a pump 74 and a valve 76 to a cooling bath 78, and is then fed by way of line 80 from the cooling bath back to the high pressure line 52. This recirculating cooling loop is generally indicated at 82, and serves to regulate the temperature of the supercritical fluid.

A purge line 84 may be connected to release pressure from the outlet line 66 by way of a heating coil 86 and an extractor 88, the extractor removing solids from the fluid. An outlet vent 90 may be provided to vent excess gas to the atmosphere.

Figure 2:
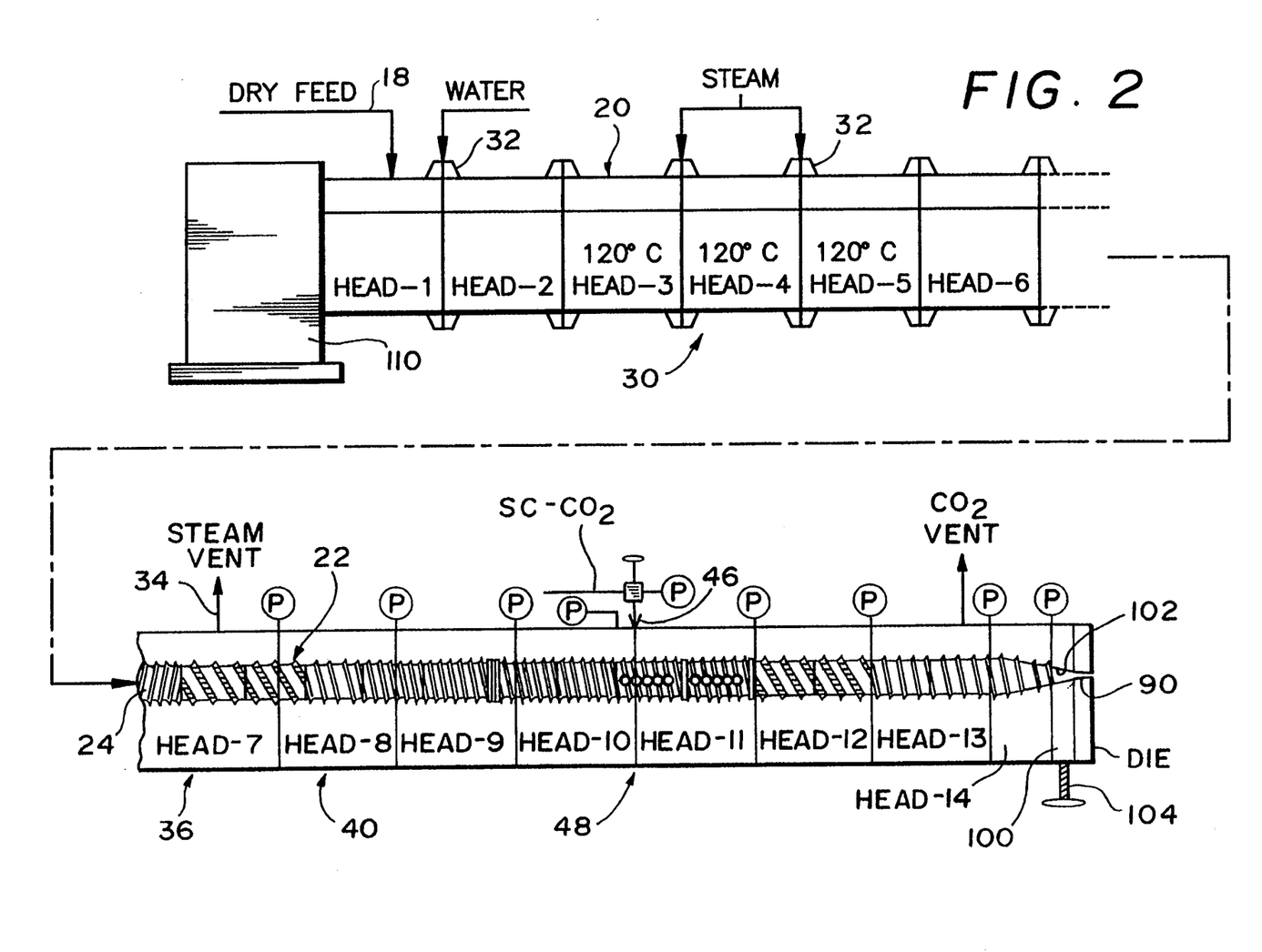
FIG. 2 is a diagrammatic illustration of a modified form of the extruder of FIG. 1.

FIG. 2 illustrates an improved extruder and extrusion process for a starch-containing product which is to be solubilized in SC—$CO_2$. A 14-head configuration is illustrated, with the first 6 heads generally indicated at 30, being used for cooking, head 7 being used for venting, and the last 8 heads being configured for barrel cooling.

In a typical process, water is injected, as illustrated at inlet 32, into the extruder barrel to achieve a product moisture content of, for example, 20%–35% by weight as the product is being conveyed along the extruder. Preconditioning can also be used where necessary to achieve complete gelatinization of the starch being extruded. The product is then conveyed through the cooking section 30 where it is cooked at about 130° C. to 140° C. Cooking is achieved via a combination of barrel heating, steam injection, and viscous dissipation. Because of the high moisture content of the product and a weak screw profile in this section, most of the energy is provided by way of barrel heating and steam injection. The steam vent 34, at head 7, the end of the cooking section, rapidly lowers the product temperature to about 100° C. in order to eliminate puffing by water flash-off when the product reaches the exit die.

To further reduce the temperature and/or remove shear energy in the supercritical fluid injection section, coolant at around 4° C. is circulated through the last eight heads. At inlet 46 at the junction of heads 10 and 11, the supercritical fluid, which may contain soluble additives, is injected into the product. As the conditions in the extruder reduce the density of the injected SC—$CO_2$, flavorants, colorants, or other additives carried by the fluid are deposited and part of the $CO_2$ is solubilized in the product. The remainder of the $CO_2$ is distributed as microbubbles intimately mixed directly in the product, resulting in the expansion of the dough and significant reduction of the pressure at the die. When the product is extruded through the die, the pressure is further reduced so that these nucleated gas bubbles expand and puff the product.

The extent of the product puffing and the amount of solute deposited in the product are controlled by the amount of supercritical fluid and the amount of solute initially introduced into the extruder, with venting of excess $CO_2$ over that needed for puffing also being provided prior to the die. Supercritical fluid conditions can be maintained within the extruder by carefully matching the screw and die configuration being used with the operating conditions within the extruder, particularly the total throughput and the injection pressure. The combination of process conditions and screw profile is selected so that backflow of injected steam and injected SC—$CO_2$ is eliminated. Also, a sufficient pressure must be maintained behind the die so that two-phase flow of fluid and dough out of the die is eliminated and the injected fluid is intimately mixed with the product.

Since the injected fluid decreases the viscosity of the product in the extruder, which may then decrease the length of the filled section of the extruder, a flow restricter 100 (FIG. 2) is provided to regulate the head pressure and thereby to regulate the filled section of the extruder. This flow restricter consists of a collar which is placed between the extruder head 14 and the final die 90, and directs the output of the extruder through a central circular opening 102 which is, for example, about 1 cm in diameter. A bolt 104 is threaded through this adaptor and can be used to decrease or increase the open area of the restricter, thereby increasing or decreasing the extrusion pressure. Increasing the back pressure at the die is critical to maintaining a stable expansion process as the SC—$CO_2$ injection pressure is increased.

The purpose of the cooking zone 30 is to completely gelatinize the starch in a starch-containing dough product such as, for example, corn meal, and in addition to produce a fully cooked final product. The extruder may operate at a speed of about 200 rpm to minimize shear heating effects over the entire length of the extruder. The product 15 supplied at a high rate with a low extruder screw speed to create a high degree of fill within the extruder. Steam is injected directly into the dough through heads 4 and 5, with heads 3, 4, and 5 being regulated at 120° by circulating fluid. The vent head 7 is used to isolate the cooking section from the cooling and from the SC—$CO_2$ injection sections. Heads 1, 2, 6, and 7 are neither heated or cooled, and thus are neutral.

The seven heads which comprise the cooling section 40 and the SC—$CO_2$ injection region 48 are cooled with, for example, 4° C. circulating water. The die may consist of a 1 mm circular opening 90 to insure a substantial filled section behind the die. Different pressure profiles along the length of the extruder may be generated by varying the extruder screw profiles. A medium shear configuration (MSC) screw profile maintains supercritical conditions within the extruder barrel when the SC—$CO_2$ is injected. The shape of the screw controls the ratio of SC—$CO_2$ to dough in the extruder, and the pressure continually decreases from the injection point toward the die as the SC—$CO_2$ mixes with the dough. The flow restricter 100 is used to maintain the back pressure at the die. This allows very high pressures to be generated within the extruder, limited by the pressure rating of the extruder and the power available from the drive motor 110, and limited by any product temperature limits imposed to control or eliminate water vapor flash off. This high pressure stabilizes the expansion process.

In one embodiment, supercritical $CO_2$ is injected into an extruder mixing section which consists of slotted $\frac{1}{2}$ pitch screws. As the $CO_2$ is injected, the density of the product is immediately reduced to 0.28 g/cm$^3$ from an unexpanded dough density of 1.62 g/cm$^3$. As the pressure was increased from about 150 psi to about 300 psi in experiments, it was found that the density of the finished product actually increased because of the collapse of the foam structure, indicating that the ratio of the $CO_2$ to the mass of the material is an important control variable.

Although the $CO_2$ process has been used to provide low density cereal or snack foods from the extruder dough, it has also been found that the invention may be especially modified and used for the continuous production of bread and bread-like products. The conventional process for producing bread involves the steps illustrated at the top of FIG. 3, the process including mixing, kneading, proofing, shaping, final proofing, rising, and then optional slicing of the bread. The proofing step conventionally consists of the fermentation of carbohydrates under controlled conditions by yeast to produce $CO_2$ for leavening the dough after it has been kneaded to obtain proper development of the gluten and after it has been mixed in the presence of air to incorporate small air bubbles into which the $CO_2$ diffuses and causes cells to grow.

Figure 3:
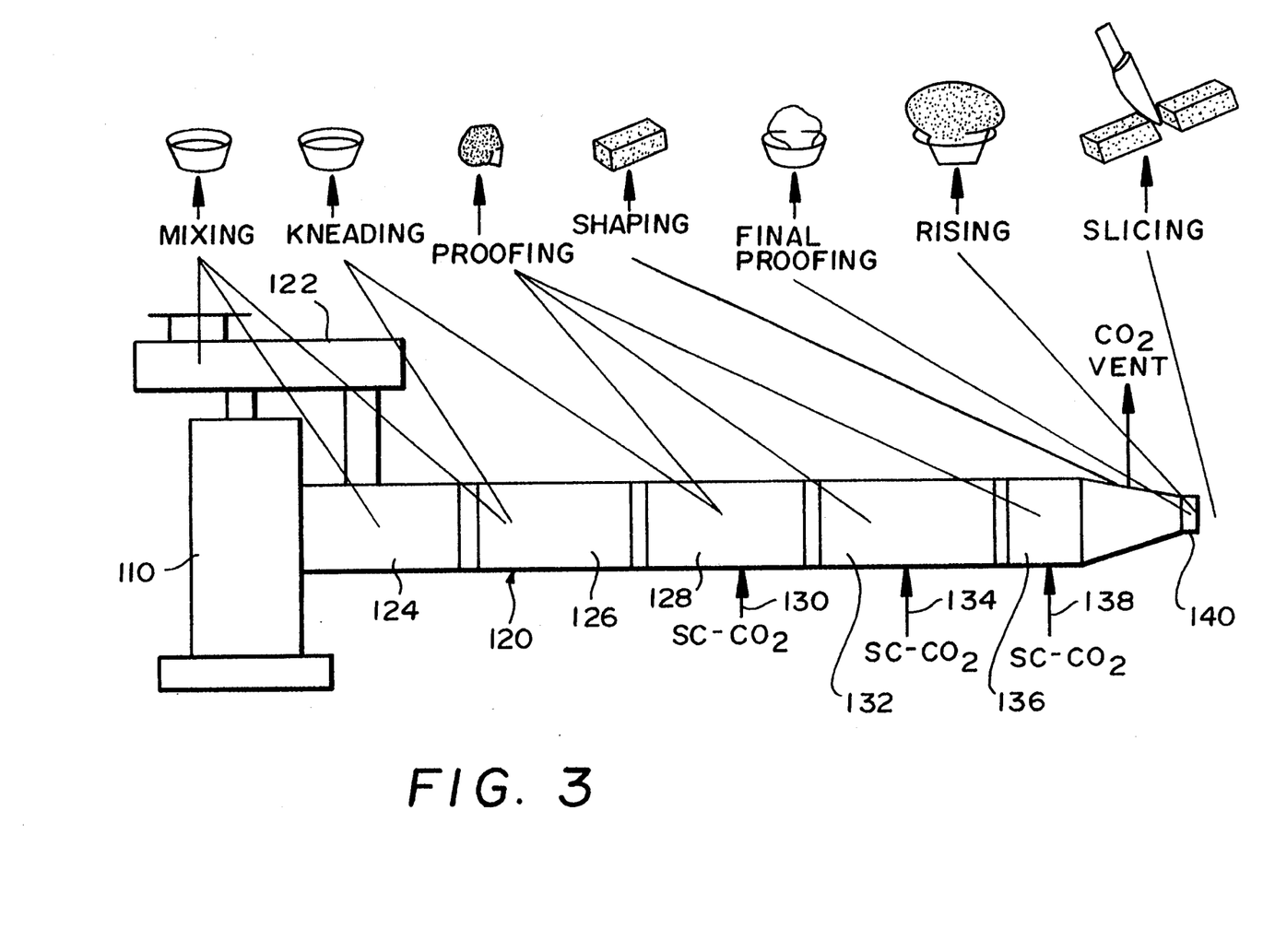
FIG. 3 is a diagrammatic illustration of an extruder utilizing supercritical fluids in bread making.

Bread production in accordance with the present invention is carried out in an extruder 120 which may be similar to that of FIG. 2, but which incorporates multiple inlets for supercritical $CO_2$ injection and does not involve cooking of the dough. Thus, the ingredients are supplied to the extruder 120 through the hopper 122 into the first section 124 of the extruder where mixing takes place to produce the dough from which the bread is to be made. The dough is fed to a second section 126 in which the appropriate rheological properties of gluten are obtained by kneading and mixing the dough. The amount of kneading and mixing that occurs in the extruder is dependent upon the dough formulation and the selected extruder screw design. In section 128 of the extruder, SC—$CO_2$ is injected by way of inlet 130 to add to the dough the flavor characteristics of a fermentation process or other desired flavors and to proof the dough. This proofing may be continued in the next succeeding section 132, where additional SC—$CO_2$ may be added through an inlet 134. Proofing may be continued in the next stage 136 of the extruder, where additional SC—$CO_2$ can be added through a third inlet 138, with the three sections 128, 132, and 136 carrying out the proofing step of the dough processing. The dough is then directed through an outlet die 140 where final proofing and shaping of the dough takes place. Either a slit die for making continuous slices or a bread-box type die for forming whole loaves may be provided.

Rising of the dough occurs upon expansion of the existing air bubbles and subsequent diffusion of the $CO_2$ gas into them as the dough passes through the die 140 and out of the extruder. This expansion process replaces the fermentation and rising of the dough in the conventional bread making process so that no fermentation step is necessary, the SC—$CO_2$ providing the required proofing and leavening. The extruded and formed bread is then baked, either before or after slicing, to set the foam structure produced in the dough by the expansion process gas and to further develop the texture and color of the bread.

The extrusion process illustrated in FIG. 3 significantly reduces the time for bread making, reducing from hours to minutes the time required. In addition, the process is continuous and is easily controllable so that various shapes can be made by simply changing the die and various flavors or colors can be added at controlled rates by way of the injected SC—$CO_2$. In addition, the expansion volume is controlled by the conditions used in the supercritical fluid extrusion process; i.e., the number of nucleated air bubbles incorporated during mixing and the amount of SC—$CO_2$ available for diffusion-controlled growth, so that the resulting characteristics of the bread are similar to conventionally baked bread and highly desirable.

Figure 4:
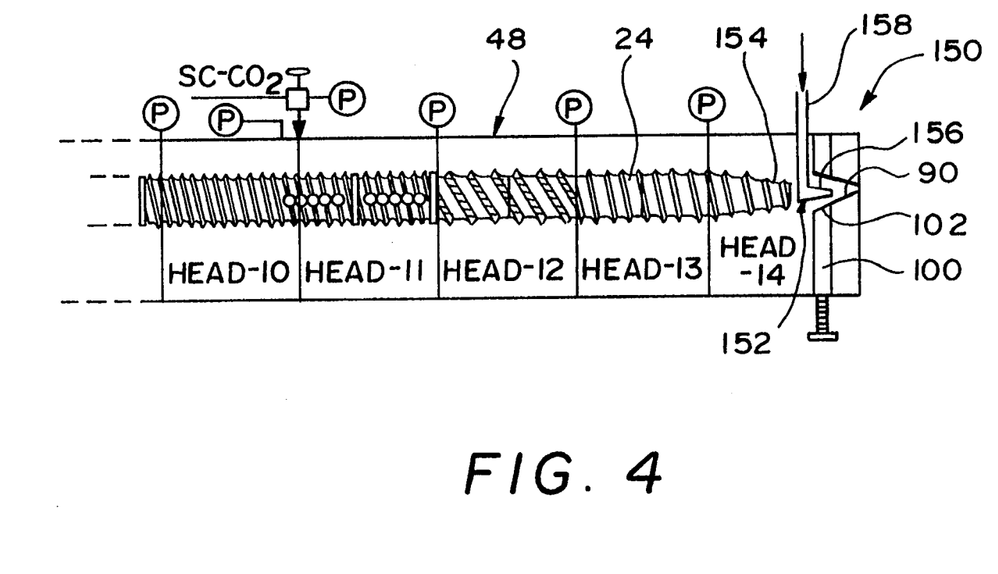
FIG. 4 is a diagrammatic illustration of an extruder modified to include a coextruder for producing a filled product.

FIG. 4 illustrates a further modification of the invention, wherein a continuous puffed or porous product is produced with another material inserted in its center during extrusion. As illustrated in FIG. 4, the extruder 48 of FIG. 2 is modified at its outlet end 150 to incorporate a centrally located coextruder 152. In this structure, the forward end 154 of the extruder shaft 24 terminates prior to the flow restricter 100 (described above with respect to FIG. 2), and the coextruder 152 is mounted in the resulting space between the end of the shaft 24 and the flow restricter, with a nozzle 156 of the coextruder extending toward and slightly into the flow restrictor opening 102. The nozzle is tapered radially inwardly and extends along the axis of the shaft so that extruded dough passes around the nozzle as it flows toward the die aperture 90. Filler material to be extruded into the center of the dough, or primary extrudent, is supplied by way of a supply tube 158 to nozzle 156 under sufficient pressure to produce the desired flow.

Figure 5:
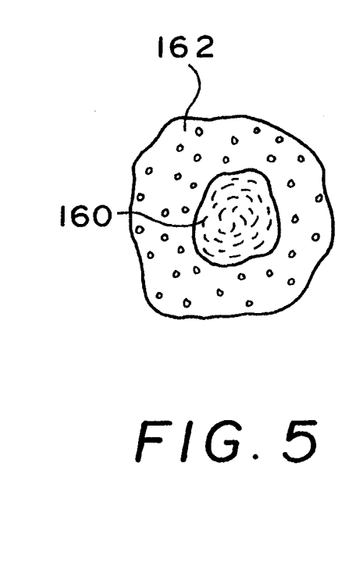
FIG. 5 is a diagrammatic cross-sectional view of a coextruded, filled food product.

It has been found that during the expansion or puffing of the product produced by the supercritical fluid extrusion process of the invention as described with respect to FIG. 2, a central empty core is produced within the naturally formed expanded outer layer of the product. As noted above, the expansion or puffing of the product occurs by gas expansion and diffusion, unlike the conventional water expansion process where the expansion involves a phase change with pressurized liquid water changing to steam at the die. In the supercritical fluid extrusion process, utilizing supercritical $CO_2$ injected into the dough, the expansion occurs gradually from inside to outside the material as it leaves the die, and it is this expansion which leaves the empty central core. In accordance with the present invention, the coextruder 152 feeds a central filler material into this empty core to produce a coextruded filled product. The filling material can consist of, for example, processed cheese or other food product fillers. As illustrated in FIG. 5, which is a cross section of the expanded food product leaving the extruder, the filler material 160 is located at the center of and coaxial with the puffed product 162 to provide a dual-textured product. It will be understood that the coextruder 152 can also be used in the extruder 120 illustrated in FIG. 3, if desired, with the nozzle 156 being located adjacent the exit die 140.

By using the supercritical fluid extrusion process, the filler material can be maintained in the center of the puffed product, a result which cannot be accomplished using conventional cooking extrusion processes.

As noted above, the supercritical fluid extrusion process using $CO_2$ enhances the dextrinization of starch. Modified starches may be defined as those starches whose hydroxyl group has been chemically altered or modified by disturbance of the initial structure. Depolymerization of starch reduces its viscosity and therefore allows its use at a higher level of dry solid. Depolymerization can be achieved by dextrinization, acid conversion, alkaline conversion, thermochemical liquefaction, and enzyme-produce liquefaction. Dextrinized starches are formed under conditions of acid, heat, and pressure which causes rupture of the $\alpha$ (1-4) C—O—C in the native starch. The functional properties of the dextrinized starch depends on how many reducing sugar residues result from this hydrolysis step. The number of reducing sugars formed depend upon the water content, with lower water contents giving lower amounts of reducing sugars. The content of reducing sugars determines the hygroscopicity, adhesiveness, color, and rheological properties of the dextrin. Under the operating conditions available in the supercritical fluid extrusion process described above, dextrins can be formed. Accordingly, one advantage of directly providing SC—$CO_2$ into a dough at a temperature around 100°–120° C. in an extruder is that the degree of acid hydrolysis can be controlled by continuously controlling the water level; i.e., the moisture content of the dough, as well as the amount of SC—$CO_2$ introduced. The solubilization of SC—$CO_2$ into the water phase results in the formation of carbonic acid and the development of an acid pH environment for starch hydrolysis. A major advantage of the present invention is that the acid environment only exists under the high pressure condition within the extruder. Upon exiting the die into an atmospheric pressure environment, the product returns to a neutral pH without any residual acid, as discussed above. In addition, the extruder provides a continuous, very short time, conversion process and allows continuous variation of the product characteristic by adjusting the SC—$CO_2$/water ratio within the extruder.

The present invention allows a low degree of hydrolysis to be imparted to a puffed product, which can then be dried and used directly as a baked-type product, a ready-to-eat cereal, or a snack food. The formation of reducing sugars in the manner described above imparts unique impleasing flavors to the extruded products. The product can be filled, as discussed above, or the modified starches produced in the manner described above can be used as a food thickener or in non-food industrial processes, the extruder product being dried and milled into desired particle sizes for use as a functional ingredient.

Although the invention has been described in terms of preferred embodiments, it will be understood that variations and modifications can be made without departing from the true spirit and scope thereof, as set forth in the following claims. For example, although the supercritical $CO_2$ is described as carrying the various flavorants, or colorants to be added to the product passing through the extruder, it will be apparent that other gases, such as air, oxygen, nitrogen, or the like, can be used for this purpose. Such gases would be directed through a liquid as described above, so that the liquid would be picked up by the gas and delivered to the product through a gas inlet to the extruder.

What is claimed is:

1. Apparatus for the continuous production of bread and bread-like products, comprising:
   an extruder having an inlet;
   means supplying ingredients for a product to be produced to said extruder inlet;
   an extruder mixer section for receiving said ingredients and for forming a dough;
   an extruder kneading section receiving and kneading said dough;
   a first extruder proofing section receiving said kneaded dough;
   a first fluid inlet supplying supercritical gas to said first proofing section;
   a second extruder proofing section receiving dough from said first proofing section;
   a second fluid inlet supplying supercritical gas to said second proofing section; and
   an exit die for said extruder for receiving dough from said second proofing section and extruding said dough out of the extruder to produce rising of said dough by the release of said supercritical gas to thereby form a continuous bread product without the fermentation of yeast.

2. The apparatus of claim 1, wherein said die is shaped to form an extruder continuous bread loaf.

3. The apparatus of claim 1, further including a third extruder proofing section receiving dough from said second proofing section; and
   a third gas inlet supplying supercritical gas to said third proofing section, said outlet die receiving dough from said third proofing section.

4. The apparatus of claim 3, wherein said die is shaped to form an extruded continuous bread loaf.

5. The apparatus of claim 1, further including a coextruder located within said extruder adjacent said outlet die for injecting a filler material into said dough as it is supplied to said exit die.

6. The apparatus of claim 5, wherein said coextruder includes a nozzle coaxial with said extruder for injecting said filler material.

7. The apparatus of claim 6, wherein said exit die is sized to produce rising of said dough as the dough leaves said die, the rising of the dough producing an open core in said dough, said coextruder nozzle being located to continuously inject said filler material into said core to produce a continuous filled bread or bread-like product.

8. A supercritical fluid extrusion process for the continuous production of a starch-containing product comprising:
   supplying starch-containing ingredients for a product to a continuous extruder;
   mixing said ingredients within said extruder to produce a dough;
   continuously advancing said dough through said extruder toward an exit die;
   cooking said dough in said extruder in the presence of steam or water;
   injecting supercritical $CO_2$ into said extruder to enhance the dextrinization of the starch in said dough;
   expanding and forming a hollow core in said dough by the release of said supercritical $CO_2$ as the dough is ejected from said extruder through an exit die; and
   coextruding a filler into said hollow core to produce a filled product.

9. A supercritical fluid extrusion process for the continuous production of bread or bread-like products, comprising:
   supplying ingredients for a bread or bread-like product to a continuous extruder;
   mixing said ingredients in said extruder to form a dough;
   advancing said dough through said extruder toward an exit die;
   kneading said dough in said extruder;
   proofing said dough in said extruder, said proofing including injecting supercritical gas into said dough as said dough advances through said extruder; and
   causing said dough to rise by extruding said dough through said exit die to enable said supercritical gas to expand within the dough.

10. The process of claim 9, wherein proofing said dough includes incorporating additives in said supercritical gas for flavoring said dough.

* * * * *